(12) United States Patent
Gangadharappa et al.

(10) Patent No.: US 10,331,696 B2
(45) Date of Patent: Jun. 25, 2019

(54) INDEXING HETEROGENEOUS SEARCHABLE DATA IN A MULTI-TENANT CLOUD

(71) Applicants: Kiran Gangadharappa, Mountain View, CA (US); Dinesh Shahane, Cupertino, CA (US)

(72) Inventors: Kiran Gangadharappa, Mountain View, CA (US); Dinesh Shahane, Cupertino, CA (US)

(73) Assignee: Ariba, Inc., Sunnyvale, CA (US)

( * ) Notice: Subject to any disclaimer, the term of this patent is extended or adjusted under 35 U.S.C. 154(b) by 785 days.

(21) Appl. No.: 14/645,193

(22) Filed: Mar. 11, 2015

(65) Prior Publication Data

US 2016/0203171 A1    Jul. 14, 2016

Related U.S. Application Data

(60) Provisional application No. 62/101,516, filed on Jan. 9, 2015.

(51) Int. Cl.
*G06F 17/30* (2006.01)
*G06F 16/27* (2019.01)

(52) U.S. Cl.
CPC .................... *G06F 16/27* (2019.01)

(58) Field of Classification Search
CPC ......... G06F 17/30321; G06F 17/30598; G06F 17/30876; G06F 17/30575; G06F 16/27
See application file for complete search history.

(56) References Cited

U.S. PATENT DOCUMENTS

| | | | | |
|---|---|---|---|---|
| 8,868,404 | B1 * | 10/2014 | Yancey | G06F 17/2836 704/7 |
| 2011/0258199 | A1 * | 10/2011 | Oliver | G06F 16/24578 707/746 |
| 2011/0289091 | A1 * | 11/2011 | Collins | G06F 17/30321 707/741 |
| 2015/0229715 | A1 * | 8/2015 | Sankar | H04L 41/0893 709/203 |
| 2015/0379058 | A1 * | 12/2015 | Chen | G06F 16/23 707/756 |

* cited by examiner

*Primary Examiner* — Huawen A Peng
(74) *Attorney, Agent, or Firm* — Schwegman Lundberg & Woessner, P.A.

(57) ABSTRACT

In an example embodiment, a method for indexing data is provided. Primary data and auxiliary data is received from a first tenant in a computer network. A first index is then created for the primary data and the auxiliary data from the first tenant. The first index is stored in a first shard. Then primary data and auxiliary data are received from a second tenant in the computer network. A second index is created for the primary data and the auxiliary data from the second tenant. The second index is then stored in the first shard. The first shard is then stored in a first instance of a distributed database, the distributed database comprising a plurality of instances, each instance operating on a different logical or physical device.

21 Claims, 10 Drawing Sheets

INDEXING HETEROGENEOUS SEARCHABLE DATA IN A MULTI-TENANT CLOUD

CROSS-REFERENCE TO RELATED APPLICATIONS

This application claims the benefit of U.S. Provisional Application No. 62/101,516, filed Jan. 9, 2015, entitled "INDEXING HETEROGENEOUS SEARCHABLE DATA IN A MULTI-TENANT CLOUD," which is incorporated herein by reference in its entirety.

TECHNICAL FIELD

This document generally relates to methods and systems for use with computer networks. More particularly, this document relates to indexing heterogeneous searchable data in a multi-tenant cloud.

BACKGROUND

The indexing and searching of structured data are important functionalities for many businesses on both sides of sales transactions. For example, sellers may provide access to catalog data (including, for example, product information on various products for sale) to buyers to allow buyers to select items to purchase or contract for. This type of usage is especially prevalent for businesses, which often procure items in large quantities directly from a supplier. Traditionally such structured data was stored in dedicated databases. An authorized buyer, for example, would gain viewing access to a supplier's database and thus be able to search directly the products in the database.

Recently there has been increased movement of data to the cloud. In such cloud environments, there is a lot more data (in both quantity and size) to be stored. This can complicate the process of indexing the data in order for it to be efficiently stored and searched.

BRIEF DESCRIPTION OF DRAWINGS

The present disclosure is illustrated by way of example and not limitation in the following figures.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In an example embodiment, indexing and searching of structured data is provided using an elastic scalable architecture with high availability features. Updating the index for one entity (e.g., supplier) does not affect other tenants, and new index types (also known as index classes) can be added without downtime. As will be described, the indexing is performed in a manner so as to minimize storage space while maximizing search speed in the cloud.

Figure 1:
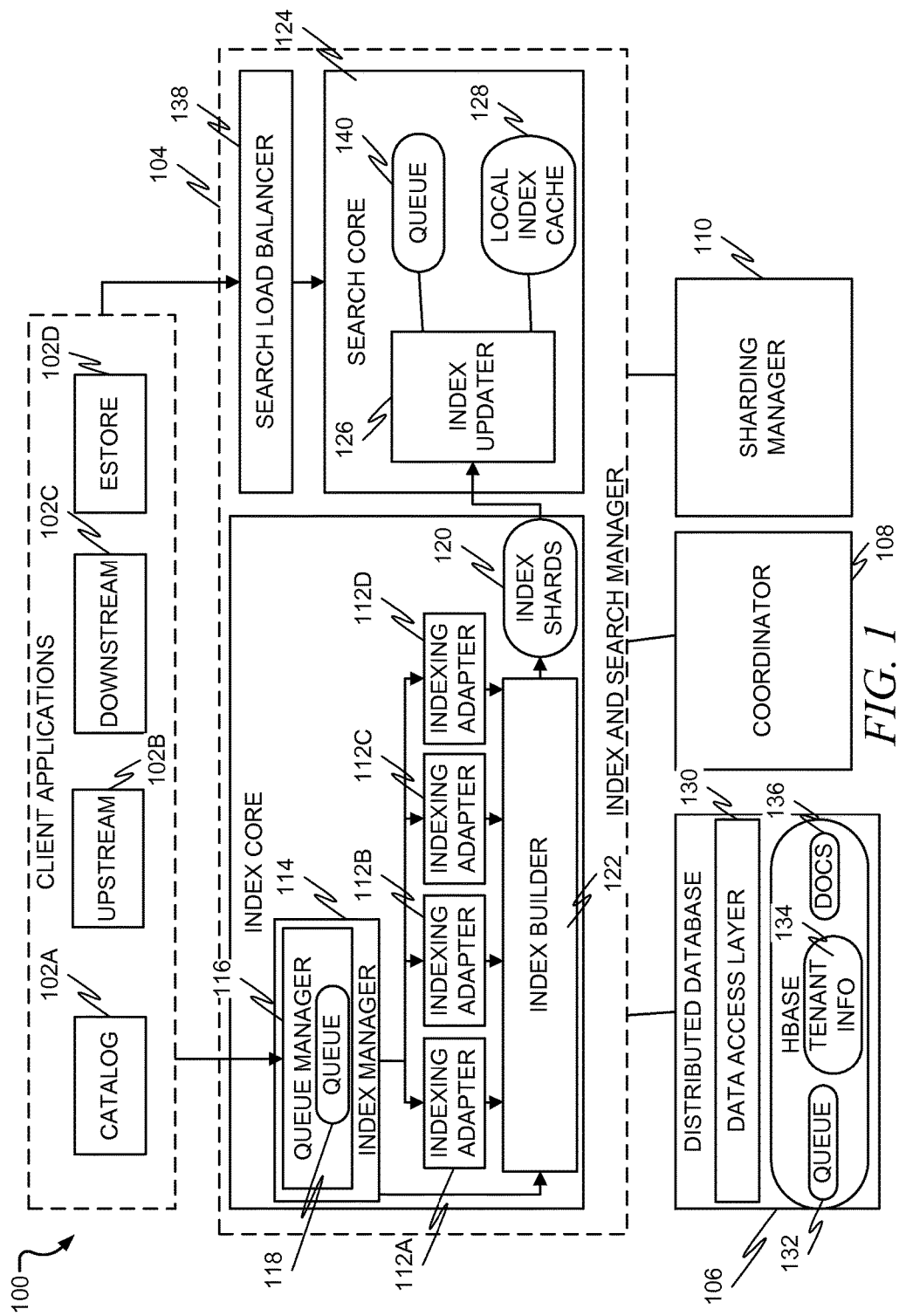
FIG. 1 is a block diagram illustrating a system, in accordance with an example embodiment, for indexing and searching structured data.

FIG. 1 is a block diagram illustrating a system 100, in accordance with an example embodiment, for indexing and searching structured data. The system 100 includes one or more client applications 102A, 102B, 102C, 102D, an index and search manager 104, a distributed database 106, a coordinator 108, and a sharding manager 110. Each client application 102A, 102B, 102C, 102D may represent a different application providing data to be indexed and eventually searched by the system 100. A single tenant (e.g., customer such as a company) may provide multiple clients, while other tenants may provide just a single client. In the depicted figure, client application 102A is or includes a catalog application, client application 102B is or includes an upstream application, client application 102C is or includes a downstream application, and client application 102D is or includes an eStore application.

Client applications 102A, 102B, 102C, 102D may provide one or more of three different types of data streams (not pictured). Each data stream may have its own different data with distinct lifecycle and purpose. These data streams may be known as primary, auxiliary, and relevance and ranking (R/R). The primary data stream may include primary data, which is the data that is the main subject of indexing and searching. The auxiliary data stream may include data that is not directly indexed or searched but may enrich the primary data. The R/R data stream may include R/R data, which is data that plays a role in relevance and ranking of primary data items during searching. As illustrative examples, if the client application 102A provides a catalog, the primary data may include Catalog Interchange Format (CIF) and Catalog Extensible Markup Language (cXML) catalogs, with the auxiliary data including supplier records, type definitions, contracts, and views, and the R/R data including a click stream and transaction data. If the client application 102B provides upstream information, the primary data may include contracts and projects, with the auxiliary data including entitlement information and the R/R data including a click stream. If the client application 102C provides downstream information, the primary data may include approvables, with the auxiliary data including master data and the R/R data including transaction data.

Data streams can be transported as single documents, a multi-part collection, or a set of documents. For each client application 102A, 102B, 102C, 102D, an indexing adapter 112A, 112B, 112C, 112D may be provided. Each indexing adapter 112A, 112B, 112C, 112D can include a parser created to parse document types supported by the corresponding client application 102A, 102B, 102C, 102D. As an example, client application 102A providing catalog data may utilize indexing adapter 112A, which may include a CIF parser (to parse primary CIF catalog data) and various XM parsers for the auxiliary data, such as kit information, Units of Measure (UOM) map, etc. Each parser may have two modes. The first mode can parse the byte stream of the incoming documents into rows. The second mode can parse the rows into an indexable object.

As pictured, the indexing adapters 112A, 112B, 112C, 112D may actually be contained in the index and search manager 104. An index manager 114 may act to manage the indexing process. This may include a queue manager 116 which manages a queue 118 containing incoming data from the client applications 102A, 102B, 102C, 102D, which needs to be indexed. The index manager 114 may act to send data at the front of the queue 118 to the appropriate indexing adapter 112A, 112B, 112C, 112D for the corresponding client while also building a request to an index builder.

In an example embodiment, the index manager 114 may have a redundant architecture that provides an application programming interface (API) to the client applications 102A, 102B, 102C, 102D to allow the client applications 102A, 102B, 102C, 102D to submit indexing jobs. The indexing message produced through the API may contain enough information to uniquely identify the request. This identification could be used to track the status of the submitted jobs.

The index manager 114 may utilize feedback from the distributed database 106 to decide on the indexing jobs to be run in the database 106 to allow a scalable computing architecture for building index shards 120. Specifically, the index manager 114 may send a request to build an index to the index builder 122, which may build the index shards 120. A search core 124 may contain an index updater 126, which can take the index shards 120 and update a local index cache 128 using the index shards 120. This local index cache 128 can then be synchronized with a network file system, which can then distribute the index to the distributed database 106. Each index shard 120 is a subset of the index for a given file type. For example, a shard could include catalog items from a subset of tenants. For large catalogs, a single catalog may span multiple index shards 120.

The distributed database may 106 may contain a data access layer 130, a queue 132, tenant information 134, and documents 136.

The search core 124 may host a Lucene index and answer search queries via search load balancer 138, which acts to balance the load of search requests among multiple instantiations of the search cores 124 on multiple physical or logical servers. The search core 124 may also expose a REST-based search and faceting API (not pictured). The search core 124 may perform aggregation, faceting, ranking, and relevance algorithms on search results. The source documents are primary indexing targets. Each source document may store a document identification key for auxiliary data. In an example embodiment, the auxiliary data itself is stored in the same index shard 120. This allows for locality of reference, so that access to an auxiliary data item related to a primary data item can be easily retrieved during a search.

The search core 124 may keep track of recent changes to the local index cache 128 in a special queue 140 receiving the updates to support search. The updates may be immediately applied to the reader but may be batched before committing to the local index segments.

The index manager 114 may use information from the coordinator 108 and the sharding manager 110 to decide on the indexing jobs to be run in the distributed database 106 to allow a scalable computing architecture for building the index shards 120.

Each index shard 120 may contain Lucene index segments for a set of tenants, as will be described in more detail below. The job of indexing may be designed as a map-reduce job that parses the source document and any auxiliary documents to create the Lucene indexing segments.

Within the local index cache 128, the primary documents may be modeled as Lucene "documents". The document fields, their indexing properties (stored, indexed, etc.), norms, etc. may be modeled in the bundle providing the local index cache 128. The auxiliary document identifications may be stored in the Lucene document for linking the auxiliary data. The actual auxiliary documents may be stored in the same index as separate documents. For example, a single shard may contain documents relating to a first tenant, including a first catalog item (with item attributes and supplied identification), a second catalog item (with item attributes and supplied identification), a third catalog item (with item attributes and supplied identification), and a supplier document with three different supplier detail files. The supplier document is a single document with the supplier detail files being auxiliary documents. The supplier document may be stored with a key matching the supplier identification field in each source document in the index.

The coordinator 108 may implement a protocol for routing, shard configuration, rolling-apply, and other management functions. The coordinator 108 may additionally provide the node status and consensus protocol.

The sharding manager 110 may implement the elasticity architecture for distributing the index across search cores 124. In an example embodiment, the sharding manager 110 may receive a HyperText Transfer Protocol (HTTP) request for a search and is aware of which search core 124 can respond to this request. It can then route the request to the specific search core 124, perhaps based at least partially on load balancing if multiple search cores 124 can respond to the request. The search core 124 may then use libraries to parse the queries and launch a search and then respond with matches found in an extensible markup language (XML) document. The XML document may comprise primary data along with the supporting auxiliary data.

In an example embodiment, data from the client applications 102A, 102B, 102C, 102D is indexed to be stored in a multi-tenant, multi-modal, distributed database (e.g., distributed database 130). "Multi-tenant" means that the data from one entity is stored along with the data from another entity, which, as will be seen, makes storage more efficient. "Multimodal" means that data from multiple client applications 102A, 102B, 102C, 102D of a single entity, including data that is parsed using a completely separate indexing adapter 112A, 112B, 112C, 112D, can be stored within that tenant's area of the distributed database 130. The distributed database 130 itself can then be distributed among multiple physical and/or logical servers.

Additionally, as will be discussed in more detail below, the distribution of the distributed database 130 can be dynamically altered so that tenants can be dynamically reassigned to different physical and/or logical servers at any time. This may be based, for example, on need, which may be based on a combination of factors, including data size, data quantity, size of the entity, and frequency of search.

As described briefly above, sharding allows for the segmentation of large amounts of data to the indexed. A segment may also be known as a tenant and represents a parameter for segmenting data. It can map to a platform tenant or some other type of entity. An object class is a search infrastructure used to support the searching of data items. The object class defines the data. It can indicate that the data is, for example, catalog data, requisition data, contract data, etc.

In an example embodiment, sharding is driven by four goals: availability, scalability, elasticity, and flexibility. Availability indicates that indexed data should be highly available (e.g., little chance of being unable to access the data at any point in time, even if some storage locations are inaccessible or down). Scalability indicates that the search infrastructure should be able to function well as the size grows, both in terms of index size and in terms of search volume. Elasticity indicates that there is an ability to dynamically assign capacity to tenants to make it easier to plan capacity and achieve better resource utilization. Flexibility indicates that different scalability requirements for different tenants or data classes can be supported.

As described above, the indexing itself may be performed using Lucene indexes. Lucene works by taking documents and fields. A document in Lucene is a class that represents a searchable item. The document is converted into a stream of plain-text tokens. The tokens are then analyzed to make the tokens more friendly for indexing and storage. Then the tokens are stored in an inverted index. Additional details about Lucene indexes are beyond the scope of this disclosure.

Figure 2:
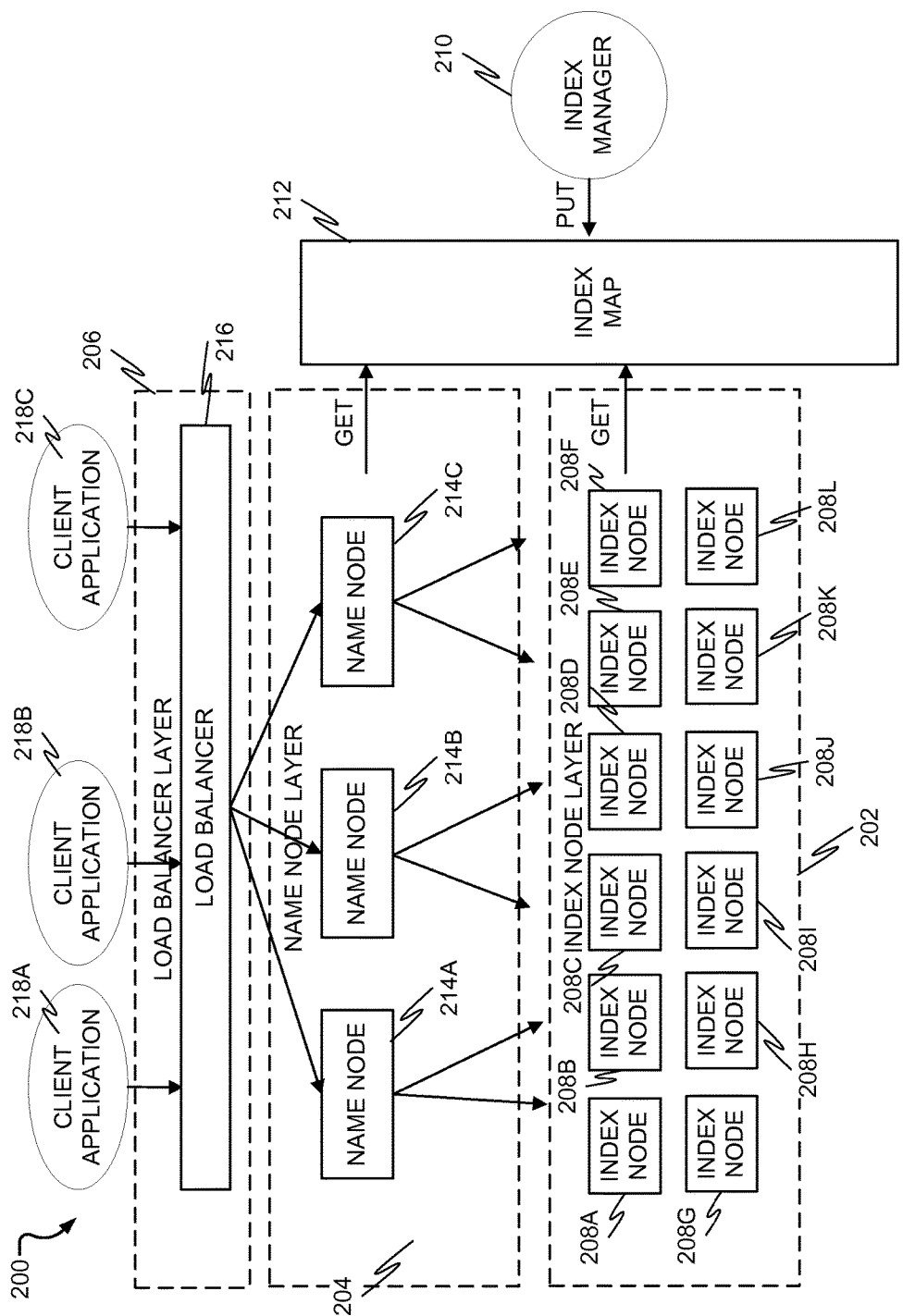
FIG. 2 is a block diagram illustrating a search infrastructure in accordance with an example embodiment.

FIG. 2 is a block diagram illustrating a search infrastructure 200 in accordance with an example embodiment. The search infrastructure 200 includes three layers: an index node layer 202, a name node layer 204, and a load balancer layer 206.

In an example embodiment, the index node layer 202 may comprise a plurality of index nodes 208A-208L, each index node 208A-208L comprising a virtual machine. In addition, each index node 208A-208L can be referred to as a shard. Each shard holds a piece of an index (or sometimes the whole index) for a given tenant. Index nodes 208A-208L are responsible executing searches on the index. It is possible that the entire tenant index fits in a single shard, but the design may assume that the tenant index may need to be distributed across multiple shards. The index manager 210 is responsible for mapping tenants to shards. The mapping information is stored in an index map 212. A federated query (query based on information from multiple sources) may be used if the tenant data is indexed to multiple shards. An index node 208A-208L may look at the tenant-to-shard mapping data stored in the index map 212 to determine if it needs to execute a local search or a federated search.

Elasticity may be accomplished by adding more index nodes 208A-208L as the index size grows or more tenants are added. Additionally, one failed data node should not cause searches to fail. In order to accomplish this, the index manager 210 can replicate the tenant data into two or more shards. In other words, any given index segment for a given tenant can be served by at least two index nodes 208A-208L.

The name node layer 204 may include a plurality of name nodes 214A-214C. Each name node 214A-214C may be an application responsible for mapping a client search request to an index node 208A-208L. Even though any index node 208A-208L may be capable of serving any search request, the goal of the name node 214A-214C is to select an index node 208A-208L that holds at least part of the tenant index. Thus, in the best-case scenario, the local search is executed by the index node 208A-208L that contains the data in its local index.

In an example embodiment, each name node 214A-214C may look at tenant-to-shard mapping data stored in the index map 212. The name node 214A-214C may perform a lookup on the index map 212 and then redirect the search request to the appropriate index node 208A-208L.

The load balancer layer 206 may include a load balancer 216, whose job it is to receive inbound search requests from client APPLICATIONS 218A-218C and invoke one or more name nodes 214A-214C to satisfy the search requests. The load balancer 216 acts to load balance these search requests among the name nodes 214A-214C.

The index manager 210 may be responsible for assigning tenants to shards. This mapping may be dynamic (e.g., the shards may be assigned to the tenants on demand at runtime). Elasticity may be accomplished by dynamically assigning available capacity to tenants on an as-needed basis.

In an example embodiment, the index manager 210 may include a tool used for capacity planning. The goal is to plan enough capacity to support the data needs for all the tenants.

In an example embodiment, the index manager 210 may be implemented by a set of nodes connected to a coordinator in an active-passive type configuration. One of the index manager nodes can be elected as the primary node by the coordinator. The backup index manager nodes can watch the "status" of the primary node and take over if needed. As will be described later, the index manager 210 can be collated with a queue manager. The primary API for the index manager 210 may be based on asynchronous queue-based messaging and therefore it makes sense to have the node play a dual role.

In an example embodiment, the index manager node subscribes to one or more tenant queues to receive indexing instructions. This may be the primary interface to the index manager 210. The index manager node may also be connected to the coordinator for watching the current shard configuration information.

Incoming messages may be classified based on the shard configuration, and new indexing tasks that can be created based on the type of messages. Table 1 below describes example structures of these messages:

TABLE 1

| Message | Schema | Description |
|---|---|---|
| <CIFType> | CIF<br>CIF File Path<br>DATA position<br>ENDOFDATA position<br>Num Items | Type definition for CIF catalog. |
| New Subscription | CIF: CIFType<br>CIF Edited File Path: CIFType<br>Tenant ID: String<br>Timestamp: long<br>Subscription Name: String<br>Closure Argument: String | Submits the new indexing task. |
| New Version | CIF: CIFType<br>CIF Edited File Path: CIFType | Creates a new version of the |

TABLE 1-continued

| Message | Schema | Description |
|---|---|---|
| | Tenant ID: String<br>Timestamp: long<br>Subscription Name: String<br>Closure Argument: String<br>Version: int | specified catalog.<br>The incremental loaded version is relayed to active cores using a special NRTUpdate message. |
| Delete Version | Tenant ID: String<br>Timestamp: long<br>Subscription Name: String<br>Closure Argument: String<br>Version: int | Deletes a Version |
| Delete Subscription | Tenant ID: String<br>Timestamp: long<br>Subscription Name: String<br>Closure Argument: String | Delete all versions for a given subscription |

Figure 3:
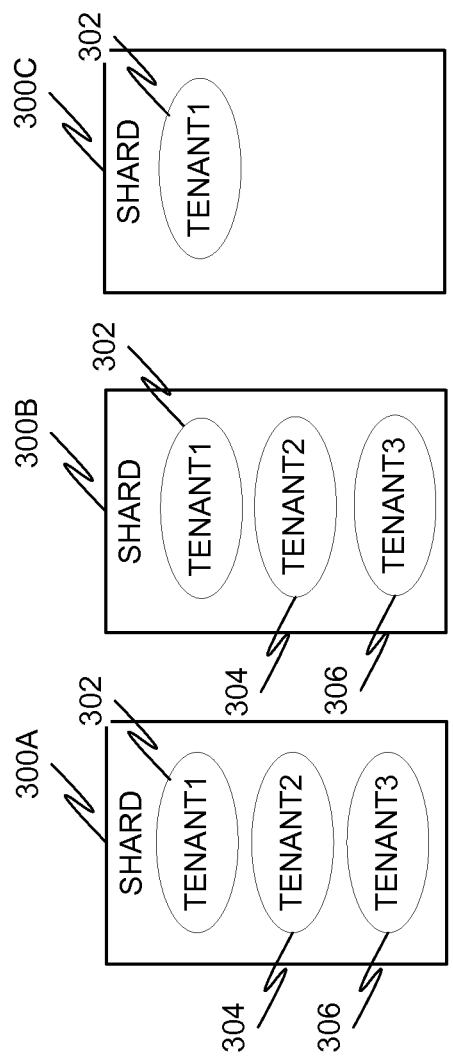
FIG. 3 is a diagram illustrating an example of elastic assignment of tenants to shards in accordance with an example embodiment.

FIG. 3 is a diagram illustrating an example of elastic assignment of tenants to shards in accordance with an example embodiment. There are three shards 300A, 300B, 300C. The first tenant 302 may be the largest and may be distributed/copied among all three shards 300A, 300B, 300C. The second tenant 304 may be smaller and fit on a single shard, but for high availability purposes is replicated on both shards 300A and 300B. Likewise, a third tenant 306 may be smaller and fit on a single shard, but for high availability purposes is replicated on both shards 300A and 300B. Shard 300A and shard 300B may then be fully occupied, whereas shard 300C may have room for more tenants. The assignments depicted here may be dynamically assigned. Thus, for example, if the size of the first tenant 302 shrank significantly while the size of the second tenant 304 grew significantly, the tenants 302, 304 could be redistributed so that the first tenant 302 was only present on shard 300A and shard 300B while the second tenant 304 was present on all three shards 300A, 300B, 300C.

The total capacity of the search infrastructure is proportional to the number of index nodes. The capacity of an index node may be defined in terms of two parameters: index size (the amount of data it can support) and throughput (the number of search results it can handle per second).

The capacity requirement for a tenant may be specified via three variables: index size increment (capacity the tenant will need in a given time window, e.g., number of active catalog items or number of transactions per year), throughput (e.g., number of expected searches per second), and a replication factor (number of times the data has to be replicated to support HA needs, which in the above example is two).

The index map 212 may be the data structure used by the index manager 210 to store tenant-to-shard mappings. The data itself may be stored in the distributed database 130. In an example embodiment, the data structure is defined as described in Table 2.

TABLE 2

| Element name | Description | Usage |
|---|---|---|
| segment_name | It can be tenant name, ANID or any other data segmentation field value. | |
| object_class | Index manager will index catalog, requisitions, cXML docs, etc. | |

TABLE 2-continued

| Element name | Description | Usage |
|---|---|---|
| current_shard | List of shards containing the current data, e.g., shard-1a:shard-3b:shard45c. This means the current data for a given segment is replicated in shard-1a, shard-3b and shard-3c. | Index manager uses it for publishing tenant data. Index manager should update it when a tenant is assigned a new shard. |
| recent_shards | List of shards that contain the most recent data. Use some syntax to identify replication (e.g., shard-1a:shard-1b, shard24d:shard34c). | Used by data nodes to determine the data nodes to execute the federated query. Index manager should update it when a tenant is assigned a new shard. |
| all_shards | List of all shards in chronological order. | Data nodes use this to execute federated search for older data. |

In an example embodiment, each shard holds an index for multiple tenants. For each tenant, the index may include both primary data and auxiliary data. The primary data index can contain auxiliary reference keys.

Figure 4:
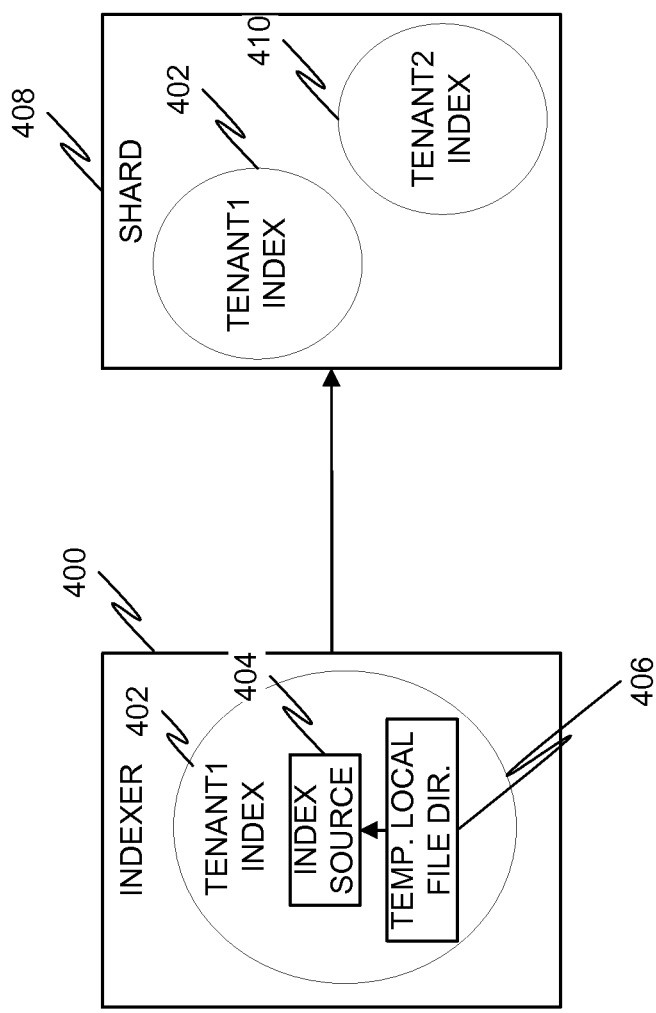
FIG. 4 is a diagram illustrating an indexer and shard in accordance with an example embodiment.

FIG. 4 is a diagram illustrating an indexer 400 and shard 408 in accordance with an example embodiment. Here, the indexer 400 may store a first tenant index 402. The first tenant index 402 may hold the index source 404 in the distributed database (e.g., the distributed database 130 of FIG. 1). When the indexer 400 receives a publish request, it can copy the index to a temporary local file directory 406, update the first tenant index 402 with data from the request, then copy the first tenant index 402 back to the distributed database. After the whole first tenant index 402 is ready, it can be written to the corresponding shard 408, where it can be stored with a second tenant index 410.

In an example embodiment, each shard represents a final manifestation of a Lucene index ready for searching.

In an example embodiment, full indexing of data can be performed as needed. This is in contrast to previous solutions which could not change the shape of the index.

In an example embodiment, the search component and the indexing component are kept separate, which allows them to run independently and potentially simultaneously. For example, while one tenant is uploading additional data for a catalog to be indexed to the indexing component, another tenant could be searching an existing version of the catalog.

Figure 5:
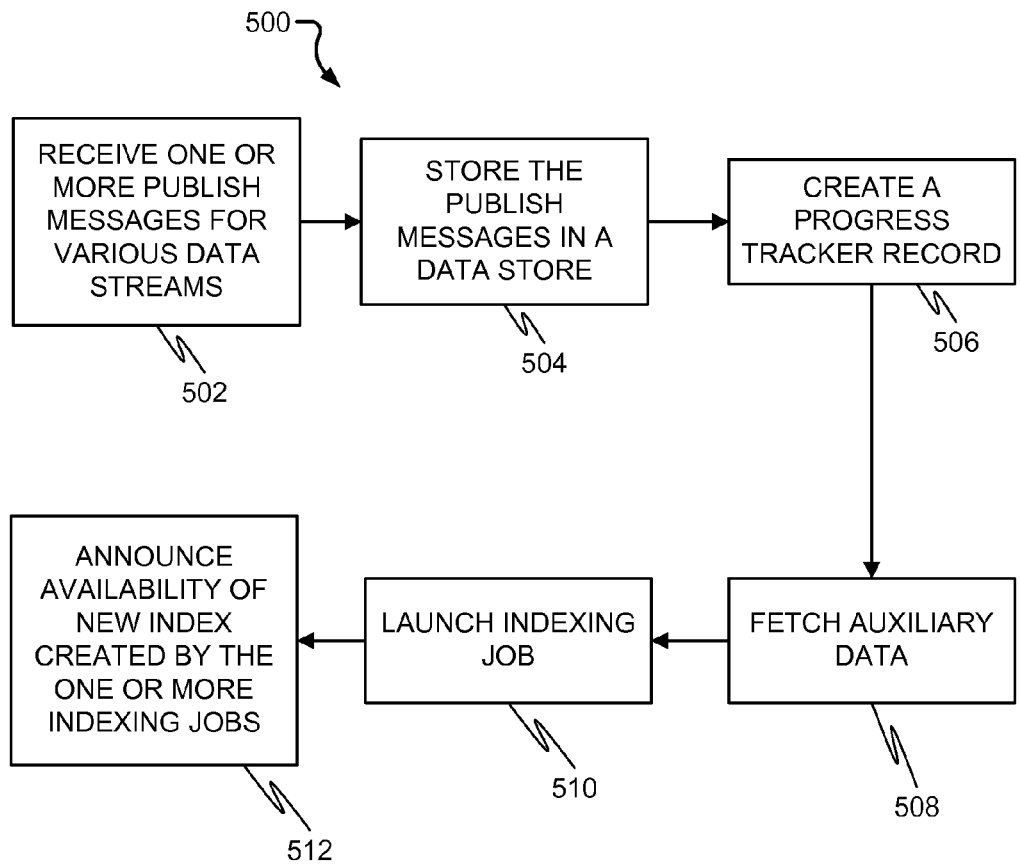
FIG. 5 is a flow diagram illustrating a method, in accordance with an example embodiment, for publishing data using the publish protocol.

In an example embodiment, a protocol for publishing (known as the publish protocol) data from a client application is described. FIG. 5 is a flow diagram illustrating a method 500, in accordance with an example embodiment, for publishing data using the publish protocol. At operation 502, one or more publish messages for various data streams (e.g., different client applications) may be received. At operation 504, the publish messages are stored in a data store. At operation 506, a progress tracker record is created. At operation 508, auxiliary data is fetched. At operation 510, an indexing job is launched. At operation 512, the availability of the new index created by the one or more indexing jobs is announced.

Figure 6:
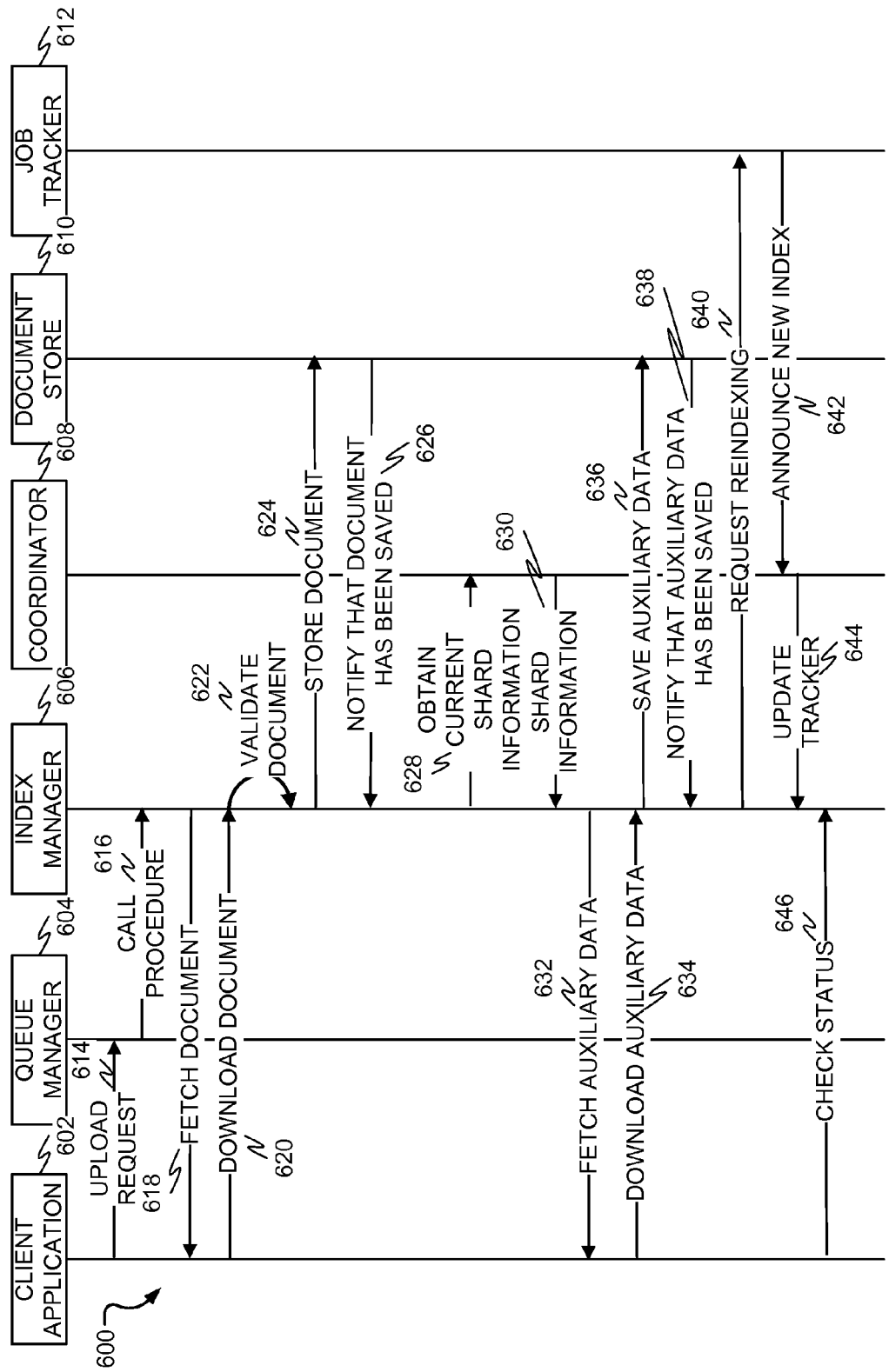
FIG. 6 is a sequence diagram illustrating a method, in accordance with an example embodiment, for publishing data using the publish protocol.

FIG. 6 is a sequence diagram illustrating a method 600, in accordance with an example embodiment, for publishing data using the publish protocol. The method 600 may utilize a client application 602, a queue manager 604, an index manager 606, a coordinator 608, a document store 610, and a job tracker 612. At operation 614, the client application 602 may send a new upload request to a queue. The location of this queue may be known to the client application 602. The queue may be hosted by the queue manager 604. In an example embodiment, the queue manager 604 may be collocated with the index manager 606. In an example embodiment, the upload request may be formatted as follows:

Message Type: NewFullLoad
Tenant: <Tenant name>
Subscription: <subscription-name>
Version: <version number>
Source Document Location: <url to download CIF file>
Auxiliary Data Location: <url to download auxiliary data>
Closure Argument: <receipt id generated by the application>

The following is an example upload request, written in Extensible Markup Language (XML):

```
Example xml message:

<?xml version="1.0" encoding="UTF-8" standalone="yes"?>
<request>
    <auxDataURL>http://auxDataURL?param=123</auxDataURL>
    <indexAdapterId>catindexer</indexAdapterId>
    <initParams>
        <entry>
            <key>b</key>
            <value>2</value>
        </entry>
        <entry>
            <key>c</key>
            <value>3</value>
        </entry>
    </initParams>
    <locale>it</locale>
    <primaryDocumentURL>file://primary%20data</primaryDocumentURL>
    <publishType>Full</publishType>
    <instructions>0</instructions>
    <relatedJobId></relatedJobId>
    <schemaURL></schemaURL>
    <tenantId>p2pTeSg</tenantId>
</request>
```

At operation 616, a procedure is called on the index manager 606 by the queue manager 604. This procedure may, at operation 618, use the information in the upload request to fetch the document to be uploaded (e.g., CIF file if the client application 602 is a catalog application). At operation 620, the index manager 606 asynchronously downloads the document. At operation 622, the index manager 606 validates the document (without parsing). In an example embodiment, the message can be further enhanced to obtain additional information potentially useful for preparing the input split for the indexing Map-Reduce job. The document (with or without the enhanced additional information) can then be stored in the document store 610 at operation 624. The document store 610 may be stored in a distributed database, such as a Hadoop database. At operation 626, the index manager 606 may receive a notification that the document has been saved.

At operation 628, the index manager 606 may query the coordinator 608 to obtain current shard information based on the upload request. This information is used to determine if resharding is necessary or not. At operation 630, the current shard information is sent to the index manager 606 by the coordinator 608.

At operation 632, the index manager 606 then downloads auxiliary data from the client application 602 to enrich the index request even further. At operation 634, the auxiliary data is sent to the index manager 606. At operation 636, the auxiliary data is stored in the document store 610. At operation 638, confirmation of the save is received by the index manager 606.

At operation 640, a request to reindex shards is sent to the job tracker 612. At operation 642, a new index is announced to the coordinator 608. At operation 644, a message is sent from the coordinator 608 to the index manager 606 to update the tracker. Later, the client application 602 may send a check status request to the index manager 606 at operation 646.

In an example embodiment, the distributed database is a Hadoop cluster. The Hadoop cluster is provided to provide a scalable way to build an index, including a full rebuild via Map-Reduce style programming. It also provides a stable storage with replication. In an example embodiment, the Hadoop cluster can be configured with the following configuration:

| Name Node | 1 | HDFS directory |
|---|---|---|
| Data Nodes | 4 | HDFS Data Storage |
| Job Tracker | 2 | Job Controller |
| Task Tracker | 4 | Running Map-Reduce Tasks |
| Secondary Name Node | 1 | Backup for HDFS directory |

Figure 7:
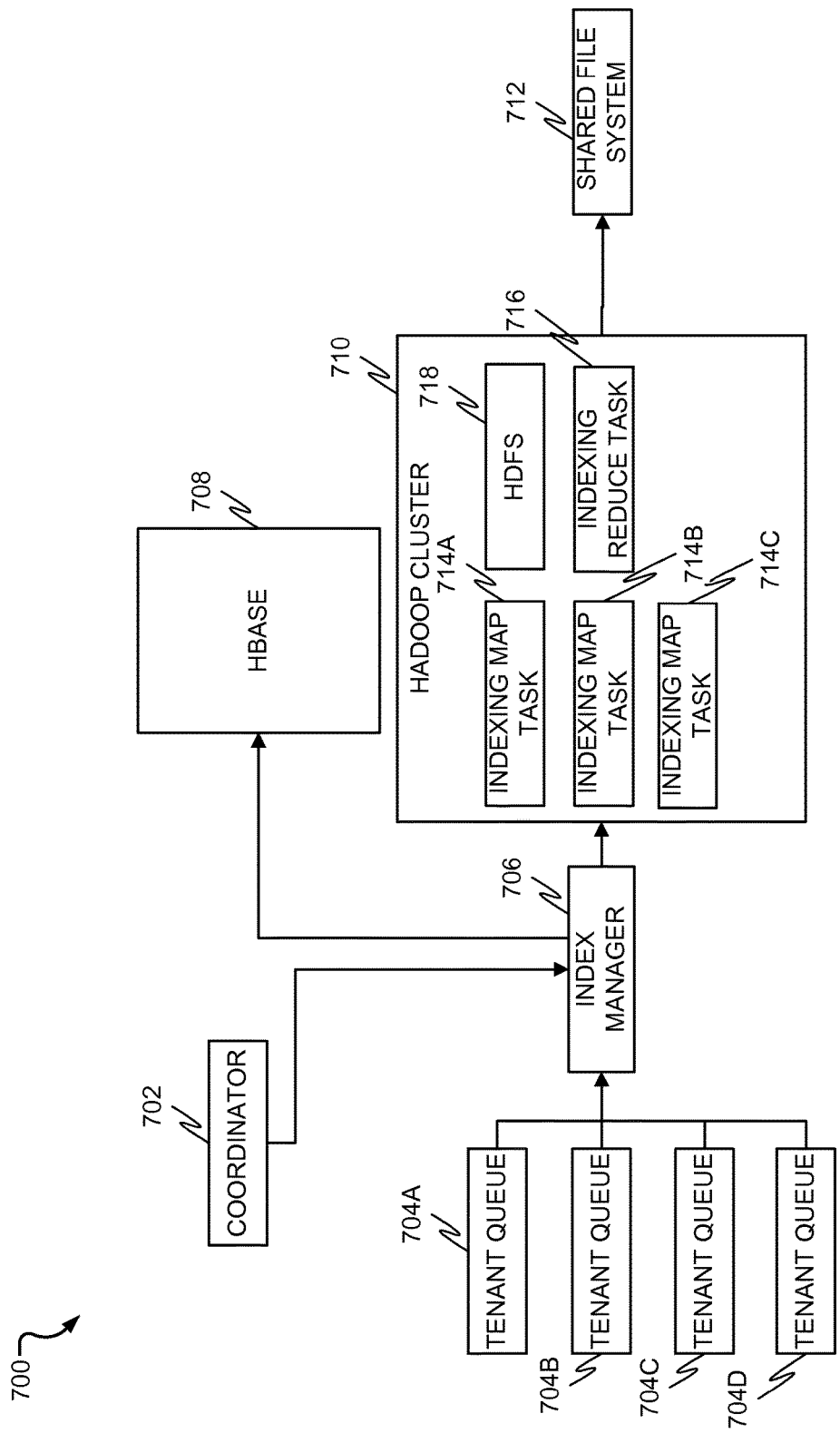
FIG. 7 is a block diagram illustrating a system, in accordance with an example embodiment, for indexing data in a Hadoop cluster.

FIG. 7 is a block diagram illustrating a system 700, in accordance with an example embodiment, for indexing data in a Hadoop cluster. The system 700 may include a coordinator 702, one or more tenant queues 704A-704D, an index manager 706, an HBase 708, a Hadoop cluster 710, and a shared file system 712. The Hbase 708 may be used to store the document corpus and relevance data. The Hadoop cluster 710 may include one or more indexing map tasks 714A-714C, an indexing reduce task 716, and an HDFS 718.

As described above, each search core may allow a client application to search the shard indexes and provide faceting information. In an example embodiment, each search core can be implemented as a set of bundles with primary functionality from Lucene searches. Additionally, a near real-time (NRT) search may be implemented using a queue message routed directly to the relevant search core. The search core may immediately apply changes to an in-memory index reader. The search core can also maintain a local log of changes (possibly in a pending queue) to eventually batch apply and optimize the index on a local disk. The local apply can guard against node failures before the next rolling apply. New index shards may be built in the Hadoop cluster and periodically copied to the host running the search core using, for example, an rsync daemon. The rsync daemon can listen to coordinator messages to initiate the copies on a periodic basis. The index can then be applied in a rolling-apply manner to ensure the uninterrupted availability of the shards for searching in each tenant. In some circumstances, when the tenant index is split into multiple shards, a distributed search can be executed by the receiving search core. The search core is then responsible for collating the data.

Figure 8:
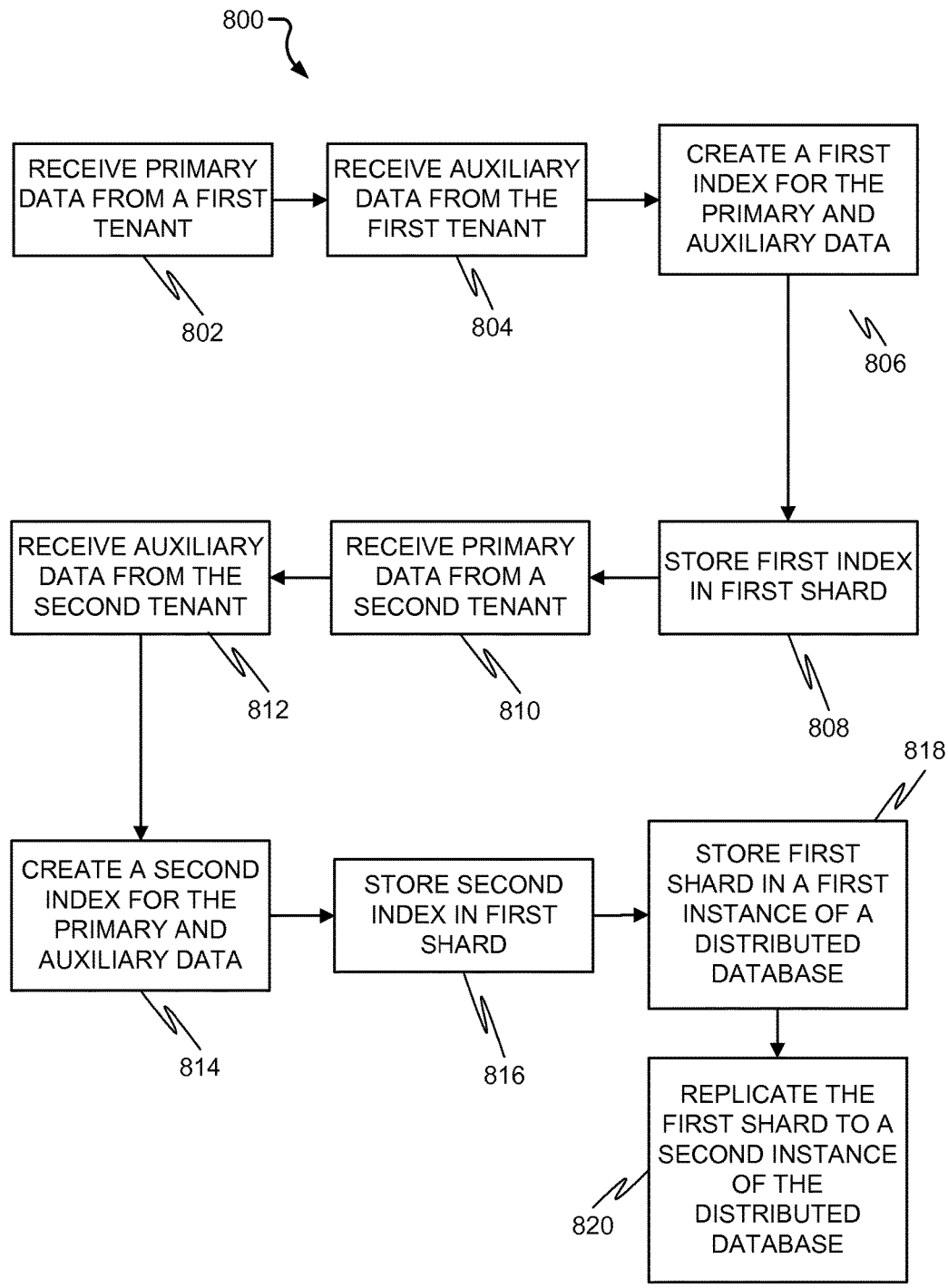
FIG. 8 is a flow diagram illustrating a method, in accordance with an example embodiment, for storing data in a shard.

FIG. 8 is a flow diagram illustrating a method 800, in accordance with an example embodiment, for storing data in a shard. At operation 802, primary data from a first tenant in a computer network is received. At operation 804, auxiliary data relating to the primary data is received from the first tenant. At operation 806, a first index for the primary data and the auxiliary data from the first tenant is created. This first index may be, for example, a Lucene index. At operation 808, the first index is stored in a first shard. At operation 810, primary data from a second tenant in the computer network is received. At operation 812, auxiliary data relating to the primary data is received from the second tenant. At operation 814, a second index is created for the primary data and the auxiliary data from the second tenant. Like the first index, the second index may be, for example, a Lucene index. At operation 816, the second index is stored in the first shard. At operation 818, the first shard is stored in a first instance of a distributed database, the distributed database comprising a plurality of instances, each instance operating on a different logical or physical device. At operation 820, the first shard is replicated to a second instance of the distributed database.

Example Mobile Device

Figure 9:
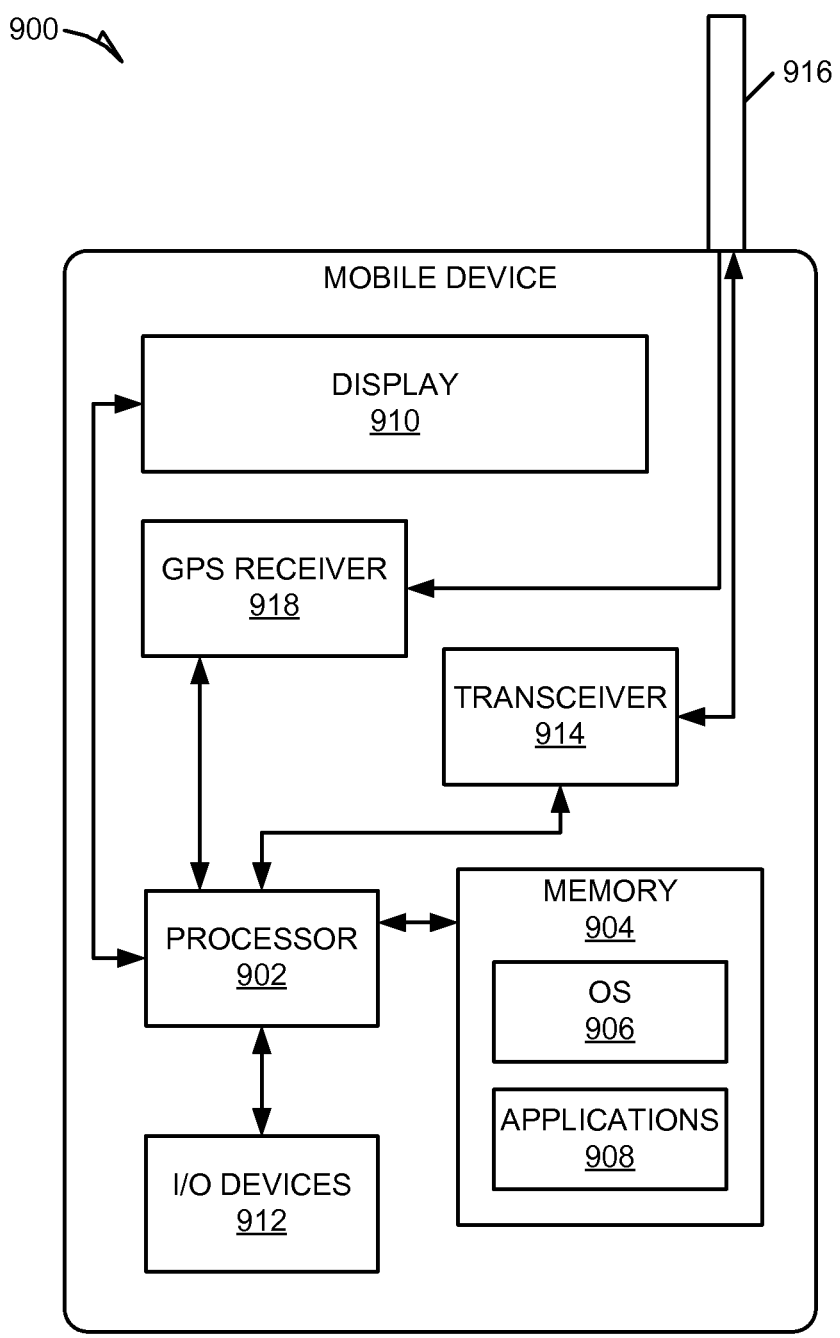
FIG. 9 is a block diagram illustrating a mobile device, according to an example embodiment.

FIG. 9 is a block diagram illustrating a mobile device 900, according to an example embodiment. The mobile device 900 may include a processor 902. The processor 902 may be any of a variety of different types of commercially available processors 902 suitable for mobile devices 900 (for example, an XScale architecture microprocessor, a microprocessor without interlocked pipeline stages (MIPS) architecture processor, or another type of processor 902). A memory 904, such as a random access memory (RAM), a flash memory, or other type of memory, is typically accessible to the processor 902. The memory 904 may be adapted to store an operating system (OS) 906, as well as application programs 908, such as a mobile location-enabled application that may provide location-based services to a user. The processor 902 may be coupled, either directly or via appropriate intermediary hardware, to a display 910 and to one or more input/output (I/O) devices 912, such as a keypad, a touch panel sensor, a microphone, and the like. Similarly, in some embodiments, the processor 902 may be coupled to a transceiver 914 that interfaces with an antenna 916. The transceiver 914 may be configured to both transmit and receive cellular network signals, wireless data signals, or other types of signals via the antenna 916, depending on the nature of the mobile device 900. Further, in some configurations, a GPS receiver 918 may also make use of the antenna 916 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) of one or more processors (e.g., processor 902) may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 10:
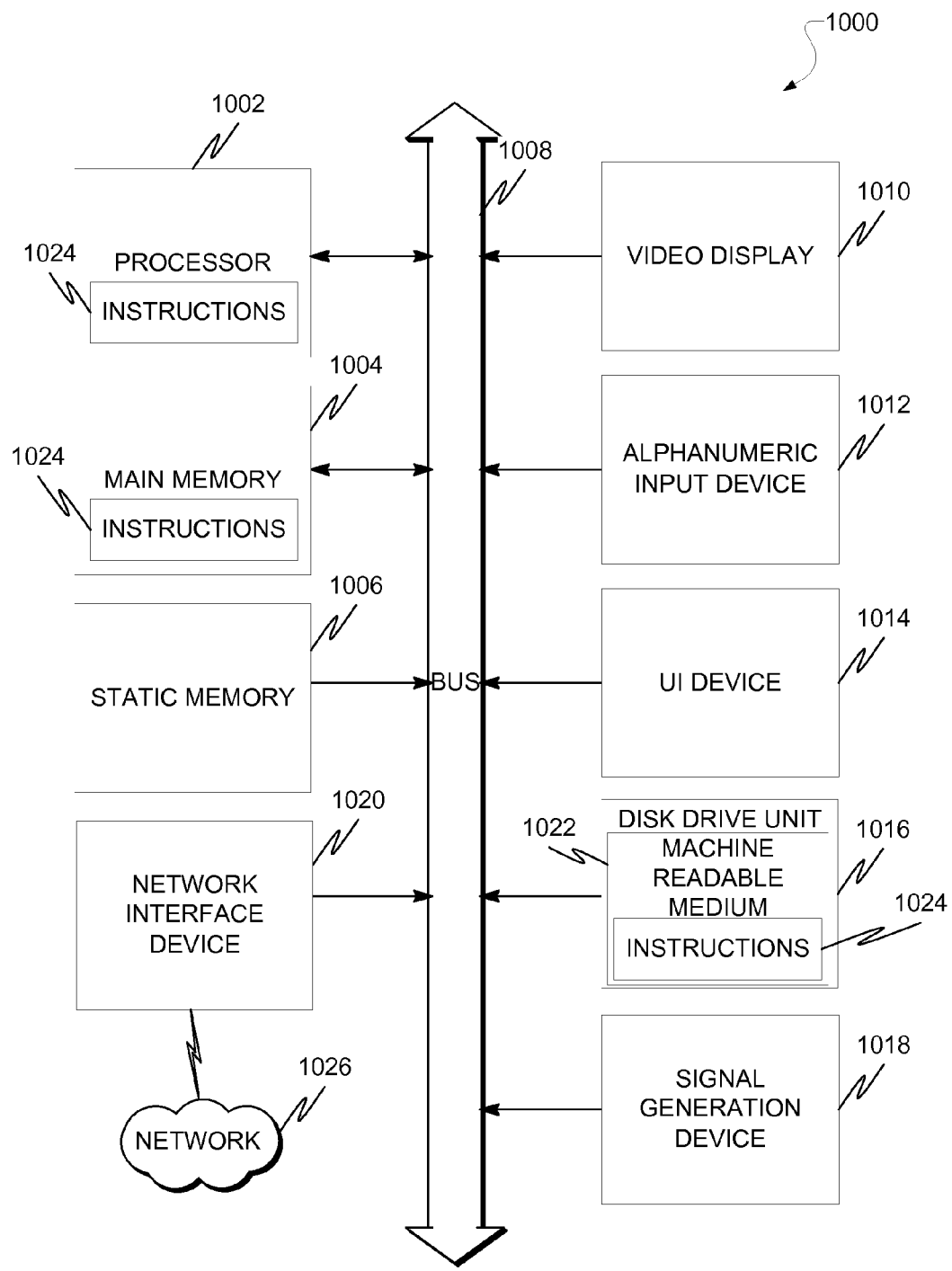
FIG. 10 is a block diagram of a machine in the example form of a computer system within which instructions may be executed for causing the machine to perform any one or more of the methodologies discussed herein.

FIG. 10 is a block diagram of machine in the example form of a computer system 1000 within which instructions 1024 may be executed for causing the machine to perform any one or more of the methodologies discussed herein. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004, and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard or a touch-sensitive display screen), a user interface (UI) navigation (or cursor control) device 1014 (e.g., a mouse), a disk drive unit 1016, a signal generation device 1018 (e.g., a speaker), and a network interface device 1020.

Machine-Readable Medium

The disk drive unit 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the computer system 1000, with the main memory 1004 and the processor 1002 also constituting machine-readable media 1022.

While the machine-readable medium 1022 is shown in an example embodiment to be a single medium, the term "machine-readable medium" may include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding or carrying instructions 1024 for execution by the machine and that cause the machine to perform any one or more of the methodologies of the present disclosure or that is capable of storing, encoding or carrying data structures utilized by or associated with such instructions 1024. The term "machine-readable medium" shall accordingly be taken to include, but not be limited to, solid-state memories, and optical and magnetic media. Specific examples of machine-readable media 1022 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network (LAN), a wide area network (WAN), the Internet, mobile telephone networks, plain old telephone (POTS)

networks, and wireless data networks (e.g., WiFi and WiMax networks). The term "transmission medium" shall be taken to include any intangible medium that is capable of storing, encoding or carrying instructions 1024 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
    receiving a first data stream from a first client application operated by a first tenant in a computer network, the first data stream containing primary data from the first tenant, the primary data being data designated to be searched directly;
    receiving a second data stream, separate from the first data stream, from the first client application, the second data stream containing auxiliary data relating to the primary data from the first tenant but not designated to be searched directly;
    creating, using at least one hardware processor, a first index for the primary data and the auxiliary data from the first tenant;
    storing the first index in a first shard;
    receiving a third data stream from a second client application operated by a second tenant in a computer network, the third data stream containing primary data from the second tenant;
    receiving a fourth data stream, separate from the third data stream, from the second client application, the fourth data stream containing auxiliary data relating to the primary data from the second tenant;
    creating, using the at least one hardware processor, a second index for the primary data and the auxiliary data from the second tenant;
    storing the second index in the first shard; and
    storing the first shard in a first instance of a distributed database, the distributed database comprising a plurality of instances, each instance operating on a different logical or physical device.

2. The method of claim 1, further comprising replicating the first shard to a second instance of the distributed database.

3. The method of claim 1, further comprising splitting the primary data from the second tenant and the auxiliary data from the second tenant between the first shard and a second shard, wherein the splitting comprises creating a first index for a first part of the primary data and the auxiliary data from the second tenant and a third index for a second part of the primary data and the auxiliary data from the second tenant, wherein the third index is stored in the second shard.

4. The method of claim 3, wherein the splitting is based on a determination that the primary data and the auxiliary data from the first tenant exceeds a size limitation of the first shard.

5. The method of claim 4, wherein the determination is performed dynamically.

6. The method of claim 3, further comprising storing the second shard in a second instance of the distributed database.

7. The method of claim 1, wherein the primary data and auxiliary data from the first tenant is received from a first client and has a first type.

8. The method of claim 7, further comprising receiving primary data and auxiliary data in a second type from a second client of the first tenant.

9. The method of claim 8, wherein the primary data and auxiliary data in the first type is indexed using a first adapter while the primary data and auxiliary data in the second type is indexed using a second adapter.

10. A system comprising:
    at least one hardware processor; and
    a computer-readable medium storing instructions that, when executed by the at least one hardware processor, cause the at least one hardware processor to perform operations comprising:
    receiving a first data stream from a first client application operated by a first tenant in a computer network, the first data stream containing primary data from the first tenant, the primary data being data designated to be searched directly;
    receiving a second data stream, separate from the first data stream, from the first client application, the second data stream containing auxiliary data relating to the primary data from the first tenant but not designated to be searched directly;
    creating, using at least one hardware processor, a first index for the primary data and the auxiliary data from the first tenant;
    storing the first index in a first shard;
    receiving a third data stream from a second client application operated by a second tenant in a computer network, the third data stream containing primary data from the second tenant;
    receiving a fourth data stream, separate from the third data stream, from the second client application, the fourth data stream containing auxiliary data relating to the primary data from the second tenant;

creating, using the at least one hardware processor, a second index for the primary data and the auxiliary data from the second tenant;

storing the second index in the first shard; and storing the first shard in a first instance of a distributed database, the distributed database comprising a plurality of instances, each instance operating on a different logical or physical device.

11. The system of claim 10, further comprising a distributed database including a plurality of instances of a database and the first shard is replicated among two or more instances of the database.

12. The system of claim 10, further comprising a coordinator configured to implement a protocol for routing and shard configuration.

13. The system of claim 12, wherein the coordinator is further configured to provide a node status and consensus protocol.

14. The system of claim 10, further comprising a sharding manager configured to implement an elasticity architecture for distributing the first index across the search core and additional search cores.

15. The system of claim 10, further comprising:
a search core;
an indexing core executable on one or more processors, the indexing core comprising: a plurality of different index adapters, each index adapter corresponding to a different document type of a different client application; and
an index builder.

16. A non-transitory machine-readable storage medium comprising instructions, which when implemented by one or more machines, cause the one or more machines to perform operations comprising:

receiving a first data stream from a first client application operated by a first tenant in a computer network, the first data stream containing primary data from the first tenant, the primary data being data designated to be searched directly;

receiving a second data stream, separate from the first data stream, from the first client application, the second data stream containing auxiliary data relating to the primary data from the first tenant but not designated to be searched directly;

creating, using at least one hardware processor, a first index for the primary data and the auxiliary data from the first tenant;

storing the first index in a first shard;

receiving a third data stream from a second client application operated by a second tenant in a computer network, the third data stream containing primary data from the second tenant;

receiving a fourth data stream, separate from the third data stream, from the second client application, the fourth data stream containing auxiliary data relating to the primary data from the second tenant;

creating, using the at least one hardware processor, a second index for the primary data and the auxiliary data from the second tenant;

storing the second index in the first shard; and storing the first shard in a first instance of a distributed database, the distributed database comprising a plurality of instances, each instance operating on a different logical or physical device.

17. The non-transitory machine-readable storage medium of claim 16, further comprising replicating the first shard to a second instance of the distributed database.

18. The non-transitory machine-readable storage medium of claim 16, further comprising splitting the primary data from the second tenant and the auxiliary data from the second tenant between the first shard and a second shard, wherein the splitting comprises creating a first index for a first part of the primary data and the auxiliary data from the second tenant and a third index for a second part of the primary data and the auxiliary data from the second tenant, wherein the third index is stored in the second shard.

19. The non-transitory machine-readable storage medium of claim 18, wherein the splitting is based on a determination that the primary data and the auxiliary data from the first tenant exceeds a size limitation of the first shard.

20. The non-transitory machine-readable storage medium of claim 19, wherein the determination is performed dynamically.

21. The non-transitory machine-readable storage medium of claim 18, further comprising storing the second shard in a second instance of the distributed database.

* * * * *